United States Patent
Kiselev et al.

(10) Patent No.: US 7,337,288 B2
(45) Date of Patent: *Feb. 26, 2008

(54) INSTANT REFRESH OF A DATA VOLUME COPY

(75) Inventors: Oleg Kiselev, Palo Alto, CA (US); John A. Colgrove, Los Altos, CA (US); Anand A. Kekre, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 11/068,546

(22) Filed: Feb. 28, 2005

(65) Prior Publication Data

US 2005/0169064 A1    Aug. 4, 2005

Related U.S. Application Data

(63) Continuation of application No. 10/326,427, filed on Dec. 19, 2002, now Pat. No. 6,880,053.

(51) Int. Cl.
*G06F 12/16*    (2006.01)

(52) U.S. Cl. ................. 711/162; 711/156; 707/204; 714/6

(58) Field of Classification Search ......... 711/156, 711/162; 714/6; 707/204
See application file for complete search history.

(56) References Cited

U.S. PATENT DOCUMENTS

| | | | |
|---|---|---|---|
| 5,155,824 A | 10/1992 | Edenfield et al. ........... 395/425 |
| 5,497,483 A | 3/1996 | Beardsley et al. .......... 395/575 |
| 5,506,580 A | 4/1996 | Whiting et al. ................. 341/51 |
| 5,532,694 A | 7/1996 | Mayers et al. ................. 341/67 |
| 5,574,874 A | 11/1996 | Jones et al. ................... 395/376 |
| 5,649,152 A | 7/1997 | Ohran et al. ................. 395/441 |
| 5,778,395 A | 7/1998 | Whiting et al. .............. 707/204 |
| 5,835,953 A | 11/1998 | Ohran ......................... 711/162 |
| 5,907,672 A | 5/1999 | Matze et al. ........... 395/182.06 |
| 6,061,770 A | 5/2000 | Franklin ...................... 711/162 |
| 6,073,222 A | 6/2000 | Ohran ......................... 711/162 |
| 6,085,298 A | 7/2000 | Ohran ......................... 711/162 |

(Continued)

FOREIGN PATENT DOCUMENTS

EP    0 332 210 A2    9/1989

(Continued)

*Primary Examiner*—Jack Lane
(74) *Attorney, Agent, or Firm*—Campbell Stephenson LLP

(57) ABSTRACT

Disclosed is a method and apparatus for refreshing a copy of a data volume. In one embodiment of the method first and second data portions of a data volume are copied to first and second memory blocks, respectively, of a memory coupled to a computer system. First and second bits of a first map stored in memory are then set, wherein the first and second bits correspond to the first and second memory blocks, respectively. The first data portion of the data volume is modified after the first data portion is copied to the first memory block. A first bit in a second map stored in memory is set after data of the first data portion is modified. An instruction is generated to refresh the data contents of the first and second memory blocks. The first bit of the first map is cleared in response to generation of the refresh instruction.

16 Claims, 6 Drawing Sheets

U.S. PATENT DOCUMENTS

| | | | |
|---|---|---|---|
| 6,141,734 A | 10/2000 | Razdan et al. | 711/144 |
| 6,189,079 B1 | 2/2001 | Micka et al. | 711/162 |
| 6,269,431 B1 | 7/2001 | Dunham | 711/162 |
| 6,282,610 B1 | 8/2001 | Bergsten | 711/114 |
| 6,341,341 B1 | 1/2002 | Grummon et al. | 711/162 |
| 6,353,878 B1 | 3/2002 | Dunham | 711/162 |
| 6,434,681 B1 | 8/2002 | Armangau | 711/162 |
| 6,460,054 B1 | 10/2002 | Grummon | 707/204 |
| 6,564,301 B1 | 5/2003 | Middleton | 711/144 |
| 6,591,351 B1 | 7/2003 | Urabe et al. | 711/162 |
| 6,785,789 B1 * | 8/2004 | Kekre et al. | 711/162 |
| 6,792,518 B2 | 9/2004 | Armangau et al. | 711/162 |
| 2003/0041220 A1 | 2/2003 | Peleska | 711/162 |

FOREIGN PATENT DOCUMENTS

| | | |
|---|---|---|
| EP | 0 566 966 A2 | 10/1993 |
| EP | 1 091 283 A2 | 4/2001 |

* cited by examiner

|   | n | $V_n$ | $M_n$ |   |
|---|---|---|---|---|
|   | 1 | 1 | 0 | ⟵ 52 |
|   | 2 | 1 | 0 |   |
|   | 3 | 1 | 0 |   |
|   | 4 | 1 | 0 |   |
|   | 5 | 1 | 0 |   |
|   | 6 | 1 | 0 |   |
|   | 7 | 1 | 0 |   |
|   | 8 | 1 | 0 |   |
|   | ⋮ |   |   |   |
|   | $n_{max}$ | 1 | 0 |   |

|   | n | $V_n$ | $M_n$ |   |
|---|---|---|---|---|
|   | 1 | 0 | 0 | ⟵ 54 |
|   | 2 | 0 | 0 |   |
|   | 3 | 0 | 0 |   |
|   | 4 | 0 | 0 |   |
|   | 5 | 0 | 0 |   |
|   | 6 | 0 | 0 |   |
|   | 7 | 0 | 0 |   |
|   | 8 | 0 | 0 |   |
|   | ⋮ |   |   |   |
|   | $n_{max}$ | 0 | 0 |   |

|   | n | $V_n$ | $M_n$ |   |
|---|---|---|---|---|
|   | 1 | 0 | 0 | ⟵ 92 |
|   | 2 | 0 | 0 |   |
|   | 3 | 0 | 0 |   |
|   | 4 | 0 | 0 |   |
|   | 5 | 0 | 0 |   |
|   | 6 | 0 | 0 |   |
|   | 7 | 0 | 0 |   |
|   | 8 | 0 | 0 |   |
|   | ⋮ |   |   |   |
|   | $n_{max}$ | 0 | 0 |   |

*FIG. 4*

|   | n | $V_n$ | $M_n$ |   |
|---|---|---|---|---|
|   | 1 | 1 | 1 | ⟵ 52 |
|   | 2 | 1 | 0 |   |
|   | 3 | 1 | 1 |   |
|   | 4 | 1 | 0 |   |
|   | 5 | 1 | 1 |   |
|   | 6 | 1 | 1 |   |
|   | 7 | 1 | 0 |   |
|   | 8 | 1 | 0 |   |
|   | ⋮ |   |   |   |
|   | $n_{max}$ | 1 | 1 |   |

|   | n | $V_n$ | $M_n$ |   |
|---|---|---|---|---|
|   | 1 | 1 | 0 | ⟵ 54 |
|   | 2 | 1 | 0 |   |
|   | 3 | 1 | 0 |   |
|   | 4 | 1 | 0 |   |
|   | 5 | 1 | 0 |   |
|   | 6 | 1 | 0 |   |
|   | 7 | 0 | 0 |   |
|   | 8 | 0 | 0 |   |
|   | ⋮ |   |   |   |
|   | $n_{max}$ | 1 | 0 |   |

*FIG. 6*

INSTANT REFRESH OF A DATA VOLUME COPY

CROSS-REFERENCE TO RELATED APPLICATIONS

The present patent application is a continuation of U.S. patent application Ser. No. 10/326,427, filed on Dec. 19, 2002, now U.S. Pat. No. 6,880,053, entitled "Instant Refresh of a Data Volume Copy" and is incorporated by reference herein in its entirety and for all purposes.

BACKGROUND OF THE INVENTION

Many businesses rely on large-scale data processing systems for storing and processing business data. The viability of a business may depend on the accuracy of the data stored within its data processing system. Human operator error or improper software operation can lead to data corruption. Businesses must stand ready to correct data corruptions. Moreover, businesses must be able to quickly correct data corruptions so that their data processing systems can resume processing transactions in the shortest possible time.

When an unexpected data corruption occurs, businesses can restore data to its state just prior to corruption using a data backup copy. FIG. 1 is a block diagram illustrating relevant components of an exemplary data processing system 10 employing data backup technology. FIG. 1 shows data processing system 10 having a host node 12, a write-data transaction log memory 14, a data storage system 16, and a data storage system 18. Data storage systems 16 and 18 include data memories 22 and 24, respectively. The data processing system 10 shown in FIG. 1 and the description thereof should not be considered prior art to the invention described or claimed herein.

Data memories 22 and 24 store data volumes. More particularly, data memory 22 stores a primary data volume of data processing system 10 while data memory 24 stores a point-in-time (PIT) backup copy of the primary data volume. The primary data volume is the working volume of data processing system 10, while the PIT backup copy, as its name implies, is a copy of the primary data volume created at a specific point-in-time.

Host node 12 may take form in a computer system (e.g., a server computer system), disk array controller or other system that receives and processes requests to read or write data to the primary data volume from client computer systems (not shown). In response to receiving these requests, host node 12 generates read or write-data transactions for reading or writing data to the primary data volume within data memory 22. A copy of each transaction that writes new data or modifies existing data of the primary data volume, is stored in write-data transaction log memory 14.

Occasionally, host node 12 unwittingly generates an invalid write-data transaction as a result of human, software, or hardware error. The invalid write-data transaction corrupts the primary data volume by inadvertently deleting good data or overwriting good data with false data. When the data corruption is discovered, host node 12 can use the PIT backup copy in data memory 24 and select write-data transactions stored in write-data transaction log memory 14 to restore the primary data volume in data memory 22 to the state it occupied just before the data corrupting event.

In the restore procedure, host node 12 applies selected write-data transactions held in write-data transaction log memory 14 to the PIT backup copy. The selected transactions are those that occurred before the write-data transaction that caused the data corruption. After host node 12 finishes applying these logged write-data transactions, the PIT backup copy is transformed into a copy of the primary data volume at the point in time just before host node 12 executed the invalid or erroneous write-data transaction. Host node 12 completes the restore process by synchronizing the corrupted primary data volume in data memory 22 to the modified copy in data memory 24. Synchronization includes overwriting each block of data memory 22 with the data contents of its corresponding block in data memory 24. Once synchronization is complete, host node 12 can resume responding to requests from client computer systems to read or write data to the primary data volume.

When creating PIT backup copy, host node 12 copies data from each block of data memory 22 that stores primary data volume data to a respective block of data memory 24 until the entire data content of the primary data volume is copied to data memory 24. Primary volume data can be compressed using a lossless compression algorithm to decrease the time needed to successfully complete the backup operation.

Often, the primary data volume is backed up several times a day. In backup operations subsequent to the first, host node 12 copies the entire contents of the primary data volume to data memory 24 in a block-by-block copy process in the manner described above, thereby overwriting data of the previous PIT backup copy. Copying the entire contents of the data volume to data memory 24, however, can be a time consuming process during which host node 12 cannot respond to client computer requests to read or write data to the primary data volume. Rather than performing a time consuming backup operations, host node 12 can refresh the PIT backup copy. Host node 12 keeps track of the blocks in data memory 22 that contain new or modified primary volume data since the last backup or refresh operation, and when a refresh operation is requested, only those blocks of data memory 22 that contain new or modified data since the last refresh or backup, are copied by host node 12 to respective blocks in data memory 24. Unfortunately, read or write access to the primary data volume, other than for copying data blocks for the refresh operation, is denied between the times the refresh operation starts and the refresh operation completes. In other words, during the refresh operation, host node 12 cannot respond to read or write requests from client computer systems.

SUMMARY OF THE INVENTION

Disclosed is a method and apparatus for refreshing a copy of a data volume. In one embodiment of the method first and second data portions of a data volume are copied to first and second memory blocks, respectively, of a memory coupled to a computer system. First and second bits of a first map stored in memory are then set, wherein the first and second bits correspond to the first and second memory blocks, respectively. The first data portion of the data volume is modified after the first data portion is copied to the first memory block. A first bit in a second map stored in memory is set after data of the first data portion is modified. An instruction is generated to refresh the data contents of the first and second memory blocks. The first bit of the first map is cleared in response to generation of the refresh instruction.

BRIEF DESCRIPTION OF THE DRAWINGS

The present invention may be better understood, and its numerous objects, features, and advantages made apparent to those skilled in the art by referencing the accompanying drawings.

FIG. 4 is a block diagram of VM maps created by the host node shown in FIG. 2;

FIG. 6 is a block diagram of VM maps in FIG. 4 after modification thereof;

The use of the same reference symbols in different drawings indicates similar or identical items.

DETAILED DESCRIPTION

The present invention relates to an apparatus and method for refreshing a data volume copy. The method can be performed by a computer system executing software instructions stored in a computer readable medium.

Figure 2:
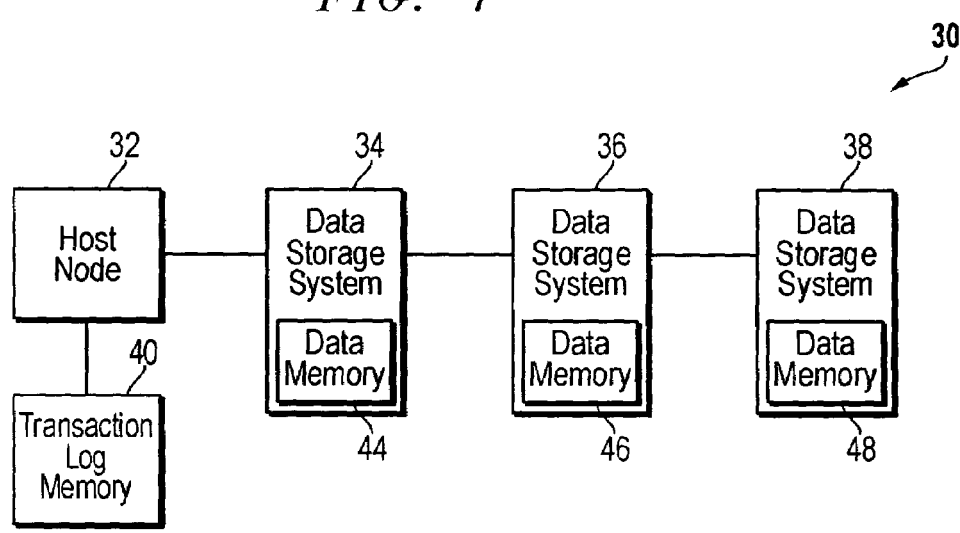
FIG. 2 is a block diagram of a data processing system employing one embodiment of the present invention.

FIG. 2 illustrates (in block diagram form) relevant components of a data processing system 30 employing one embodiment of the present invention. Data processing system 30 includes a host node 32 coupled to data storage systems 34-38, and a write-data transaction log memory 40. Data storage systems 34-38 include data memories 44-48, respectively. FIG. 2 shows host node 32 coupled directly to, for example, data storage system 34. The definition of the term coupled devices should not be limited to two devices coupled directly together. Two devices (e.g., host node 12 and data storage system 34) may be coupled together via a third device. Although data storage systems 34-38 appear to be coupled in series with each other and host node 32, the present invention should not be limited thereto. Data storage systems 34-38 may be coupled in parallel with host node 32.

Data memory 44 stores a primary data volume of data processing system 30. Host node 32 may take form in a computer system (e.g., a server computer system) that processes requests from client computer systems (not shown) to read or write data to the primary data volume. Host node 32 generates read or write-data transactions that access the primary data volume in memory 44 in response to receiving requests to read or write data from client computer systems. Memories 46 and 48 store data volume copies. Data memory 46 stores a point-in-time (PIT) backup copy of the primary data volume, while memory 48 stores a second PIT backup copy of the primary data volume or a copy of the PIT backup copy stored in memory 46. Host node 32 is capable of accessing any of the data volumes in memories 44-48 via read or write-data transactions. As will be more fully described below, the data volume copies in memories 46 and 48 can be either virtual or real, and a virtual data volume copy can be converted to a real data volume copy via a background data copying process. For purposes of definition, memories 46 and 48 can store virtual data volume copies even though memories 46 and 48 store no actual data.

Host node 32 can refresh the data volume copies in memories 46 and 48 regardless of whether these data volume copies are virtual or real. At any time, the PIT backup copy in memory 46 can be refreshed by host node 32 to the state of the primary data volume or to the state of the data volume copy in memory 48. Likewise, the data volume copy in memory 48 can be refreshed by host node 32 to the state of the primary data volume or to the state of the PIT backup copy in memory 46. Lastly, host node 32 can refresh the primary data volume to the state of the data volume copy in memory 46 or memory 48.

The primary data volume in memory 44 is a collection of files that store data. While it is often said that files store data, in reality files represent an organization of blocks of data memory 44 maintained by host node 32. Methods of organizing data blocks into files are well known in the art. The present invention will be described with reference to storing the primary data volume in a data storage system separate from the data storage system that stores the PIT backup copy, it being understood that the present invention should not be limited thereto.

Data memories 44-48 may take form in one or more dynamic or static random access memories, one or more arrays of magnetic or optical data storage disks, or combinations thereof. Data memories 44-48 should not be limited to the foregoing hardware components; rather, data memories 44-48 may take form in any hardware, software, or combination of hardware and software in which data may be persistently stored and accessed. Data memories 44-48 may take form in a complex construction of several hardware components operating under the direction of software. The data memories may take form in mirrored hardware. It is further noted that the present invention may find use with many types of redundancy/reliability systems. For example, the present invention may be used with Redundant Array of Independent Disks (RAID) systems. Moreover, the present invention should not be limited to use in connection with the host node of a data storage network. The present invention may find use in a storage switch or in any of many distinct appliances that can be used with a data storage system.

Figure 3:
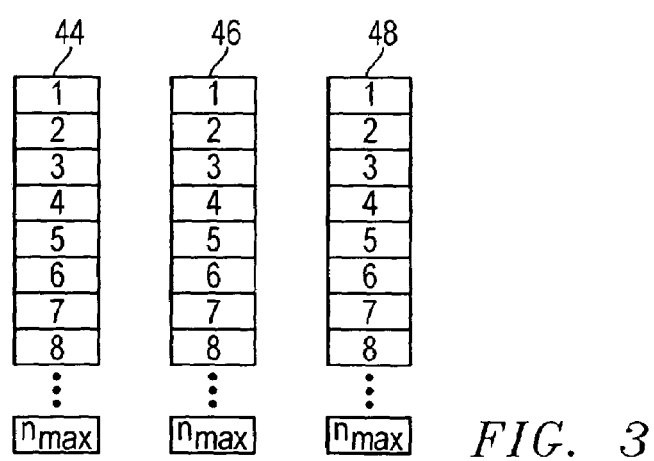
FIG. 3 includes block diagrams illustrating memory structure of data storage systems shown in FIG. 2.

FIG. 3 represents (in block diagram form) a logical structure of data memories 44-48. Each of data memories 44-48 includes $n_{max}$ memory blocks into which data can be stored. Each memory block may be an abstraction consisting of one to an arbitrarily large number of regions of memories 44-48 that store data. The regions of a block need not be continuous in memories 44-48. However, the regions can be viewed as logically contiguous by a data management system executing on host node 32. For purposes of explanation, each block of data memory 44 is allocated to and stores data of the primary data volume. Although the blocks of each memory are shown contiguous in FIG. 3, the present invention should not be limited thereto. For example, memory blocks allocated to the primary data volume may be distributed across several memory devices that form data memory 44. Moreover, it is noted that any or all of memories 44-48 may have more than $n_{max}$ memory blocks. $N_{max}$ blocks of data memories 44 and 46, however, are allocated by host node 32 for storing the primary data volume and the PIT backup copy thereof, respectively. Corresponding memory blocks in data memories 44-48 can be equal in size. Thus, memory block 1 of data memory 44 can be equal in size to memory block 1 of data memories 46 and 48. Each of the memory blocks within data memory 44 may be equal in size to each other. Alternatively, the memory blocks in data memory 44 may vary in size.

Host node 32 includes a data storage management system (not shown) that takes form in instructions executing on one or more processors within host node 32. The data management system may include a file system and a system for managing the distribution of the data of the primary volume across the several memory devices of data memory 44 and for managing the distribution of the data of the PIT backup volume across the several memory devices of data memory 46. Volume Manager™ provided by VERITAS Software Corporation of Mountain View, Calif., is an exemplary system for managing the distribution of volume data across memory devices. Volume and disk management products from other software companies also provide a system for managing the distribution of volume data across memory devices. Hardware RAID adapter cards and RAID firmware built into computer systems likewise provide this function.

Host node 32 generates read and write-data transactions described above in response to receiving and processing requests to read and write data from client computer systems (not shown). For purposes of description, requests to read and write data are distinct from read or write-data transactions generated by host node 32. In general, read or write-data transactions result in I/O operations to data memories 44-48. Data storage system 34 (FIG. 2) returns primary volume data to the host node 32 in response to receiving a read-data transaction therefrom, or data storage system 34 returns an acknowledgement to the host node 32 that data has been successfully stored in response to receiving a write-data transaction therefrom.

Figure 1:
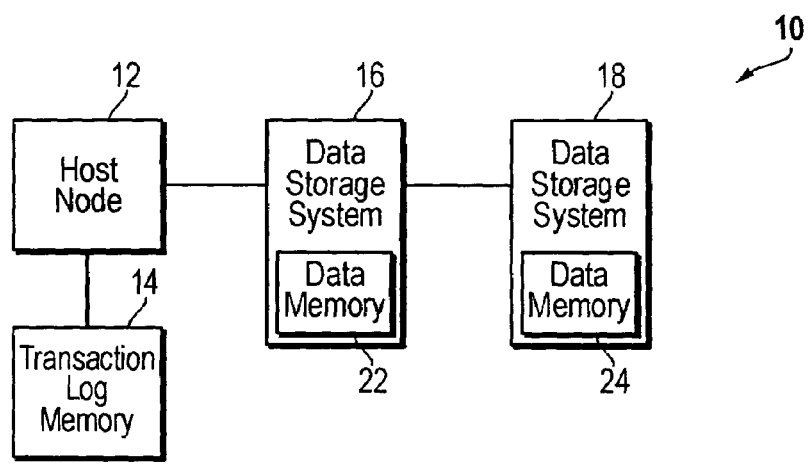
FIG. 1 is a block diagram of a data processing system.

Host node 32 creates the PIT backup copy of the primary data volume stored in data memory 44. In one embodiment, host node 32 initially creates a virtual PIT backup copy in data memory 46 according to the methods described in copending U.S. patent application Ser. No. 10/143,059 entitled Method and Apparatus for Creating a Virtual Data Copy (incorporated herein by reference), or in copending U.S. patent application Ser. No. 10/254,753 entitled Method and Apparatus for Restoring a Corrupted data volume (incorporated herein by reference). The virtual PIT backup copy in data memory 46 can eventually be transformed to an actual or real PIT backup copy of the primary data volume using a background copying process implemented on host node 32. Unlike the data processing system 10 of FIG. 1, the primary data volume in data memory 44 (and the virtual PIT backup copy in data memory 46) can be accessed by read and write-data transactions generated by host node 32 before the virtual PIT backup copy is transformed to an actual or real PIT backup copy. These concepts are more fully described in copending U.S. patent application Ser. Nos. 10/143,059 and 10/254,753.

Initially (i.e., before any PIT backup copy is created in data memory 46) data memory 46 contains no data. In one embodiment, host node 32 creates the virtual PIT backup copy in data memory 46 by creating a pair of valid/modified (VM) maps such as VM maps 52 and 54 illustrated in FIG. 4. FIG. 4 also shows a VM map 92 associated with data memory 48 that will be more fully described below. VM maps 52 and 54 correspond to the primary data volume and the virtual PIT backup copy thereof, respectively. Hence, VM maps 52 and 54 may be referred to as primary volume and PIT backup VM maps 52 and 54, respectively. VM maps 52 and 54 may be persistently stored in memory of host node 32 or elsewhere. VM maps 52 and 54 include $n_{max}$ entries of two bits each in the embodiment shown. Each entry of primary volume VM map 52 corresponds to a respective block of data memory 44, while each entry of PIT backup VM map 54 corresponds to a respective block of data memory 46. In an alternative embodiment, each entry of primary volume VM map 52 may correspond to a respective group of blocks of data memory 44, while each entry of PIT backup VM map 54 may correspond to a respective group of blocks of data of data memory 46.

The first and second bits in each entry are designated $V_n$ and $M_n$, respectively. $V_n$ in each entry, depending on its state, indicates whether the corresponding block n of the associated memory contains valid data. For example, when set to logical 1, $V_2$ of primary volume VM map 52 indicates that block 2 of data memory 44 contains valid primary volume data, and when set to logical 0, $V_2$ of primary volume VM map 52 indicates that block 2 of data memory 44 contains no valid primary volume data. It is noted that when $V_n$ is set to logical zero, the corresponding memory block n may contain data, but the data is not considered valid. $V_2$ of PIT backup VM map 54, when set to logical 1, indicates that block 2 of data memory 46 contains a valid copy of data in block 2 of data memory 44 that existed at the time the PIT backup copy was first created or at the time the PIT backup copy was last refreshed. $V_2$ of PIT backup VM map 54, when set to logical 0, indicates that block 2 of data memory 46 does not contain a valid copy of data of the primary data volume. $M_n$ in each entry, depending upon its state, indicates whether data within the corresponding block n of the associated memory has been modified since some point in time. For example, when set to logical 1, $M_3$ of primary volume VM map 52 indicates that block 3 of data memory 44 contains data that was modified via a write-data transaction since the PIT backup copy was last refreshed. When set to logical 0, $M_3$ of primary volume VM map 52 indicates that block 3 of data memory 44 contains data unmodified since the PIT backup copy was last refreshed. It is noted that one or more of the $M_n$ bits of primary volume VM map 52 can be set to logical 1 before the PIT backup copy is refreshed, and subsequently cleared to logical zero when the PIT backup copy is refreshed as will be more fully described below.

When VM maps 52 and 54 are first created, each entry of PIT backup VM map 54 is set to logical 0, thus indicating that data memory 46 contains no valid or modified data. For purposes of explanation, it is presumed that each block of data memory 44 contains valid data of the primary volume. Accordingly, $V_n$ of each entry in primary volume VM map 52 is initially set to logical 1. Lastly, $M_n$ of each entry in VM maps 52 and 54 is initially set to logical 0. Host node 32 can change the state of each bit in map entry using a single or separate I/O operation at the memory address that stores the map entry.

After VM maps 52 and 54 are initiated, host node 32 may run a background process to copy data contents of data memory 44 to data memory 46 in a block-by-block or blocks-by-blocks manner. Eventually, this background process will completely copy the contents of the primary data volume into data memory 46, thus transforming the virtual PIT backup copy in data memory 46 into a real PIT backup copy. However, before the background copying process is started, or before the background copying process is completed, host node 32 can access the primary data volume with read or write-data transactions for the purpose of responding to client computer system requests to read or write data to the primary data volume. Before the background copying process is started, or before the background copying process is completed, host node 32 can access the PIT backup copy in memory 46 via read or write-data transactions to perform operations unrelated to the background copying process. Lastly, before the background copying process is started, or before the background copying process is completed, host node 32 can refresh the PIT backup copy in memory 46 to the state of the primary data volume even after data in the primary data volume has been modified.

Figure 5:
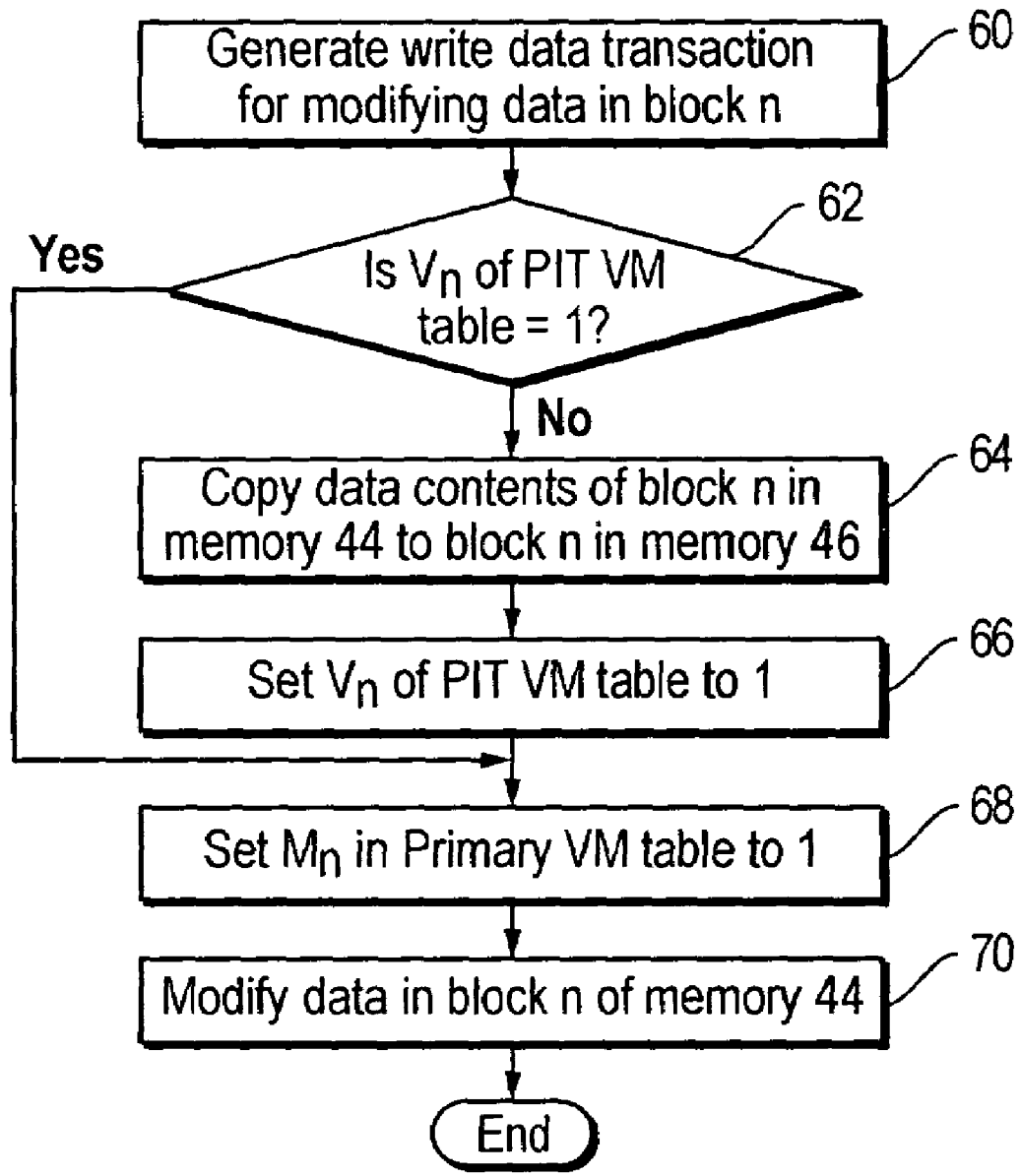
FIG. 5 is a flow chart illustrating operational aspects of writing or modifying data in the primary data volume after creation of a PIT backup copy of the primary data volume.

FIG. 5 illustrates relevant operational aspects of modifying or writing new data to the primary data volume via a write-data transaction immediately after creation of the virtual PIT back up. FIG. 5 will be described with the presumption that a virtual PIT backup copy of the primary data volume has been created. In FIG. 5, step 60, host node 32 generates a write-data transaction for modifying data of the primary data volume in response to receiving a request to write data to the primary data volume. For purposes of explanation, the phrase "modifying data in the primary volume" includes writing new data to the primary volume. The write-data transaction identifies a block n of data memory 44 that is the subject of the operation. For purposes of explanation, it is presumed that the write-data transaction is directed to modifying data contained a single block n of data memory 44. A copy of the write-data transaction is stored in write-data transaction log memory 40. Write-data transaction log memory 40 stores transactions in the order received.

Host node 32 accesses PIT backup VM map 54 to determine whether the data contents of block n of data memory 44 were previously copied to block n of data memory 46. More particularly, host node 32 accesses PIT backup VM map 54 to determine whether $V_n$ is set to logical 1 in step 62. In an alternative to step 62, host node 32 determines whether $M_n$ of the primary volume VM map 52 is set to logical 1. Block n of data memory 46 will contain valid data, (i.e., $V_n$ of VM map 54 or $M_n$ of VM map 52 is set to logical 1) if the contents of block n in data memory 44 were previously copied to block n of data memory 46 by the background copying process mentioned above, or in response to a previous write-data transaction to modify data of block n of data memory 44. If $V_n$ of PIT backup VM map 54 is set to logical 0, then the process continues to step 64 where, as shown, host node 32 copies the contents of block n of data memory 44 to block n of data memory 46. Thereafter, in step 66 host node 32 sets $V_n$ of PIT backup VM map 54 to logical 1. It is noted that the order of steps 64 and 66 can be reversed in an alternative embodiment. In this alternative embodiment, however, if a crash occurs after the step of setting $V_n$ of PIT backup VM map 54 to logical 1 but before data of block n in data memory 44 is copied to block n of data memory 46, then PIT backup VM map 54 may indicate that block n of data memory 46 contains valid data when, in fact, block n of data memory 46 contains no data at all. Host node 32 may be configured to check for and correct such inconsistencies between PIT backup VM map 54 and data memory 46 when host node 32 recovers from the crash.

After step 66, the process continues to step 68 where host node 32 sets $M_n$ in primary volume VM map 52 to 1. Thereafter, in step 70, data in block n of data memory 44 is modified according to the write-data transaction of step 60. It is noted that the order of steps 68 and 70 may be reversed.

Subsequent write-data transactions for writing or modifying data of the primary data volume are implemented using the process shown in FIG. 5. Although not shown in FIG. 5, primary volume data can be copied from blocks of data memory 44 to respective blocks of data memory 46 via the background copying process. FIG. 6 illustrates the state of VM maps 52 and 54 after execution of several write-data transactions and after data is copied from blocks of data memory 44 to respective blocks of data memory 46 via the background copying process. FIG. 6 shows PIT backup copy still in the virtual state since one or more of $V_n$ bits of map 54 are set to logical 0. The PIT backup copy of the primary data volume, whether virtual or real, can be used in an operation to restore the primary data volume in data memory 44. An example of a restore operation using the PIT backup copy is described in copending U.S. patent application Ser. No. 10/254,753.

Figures 7, 8:
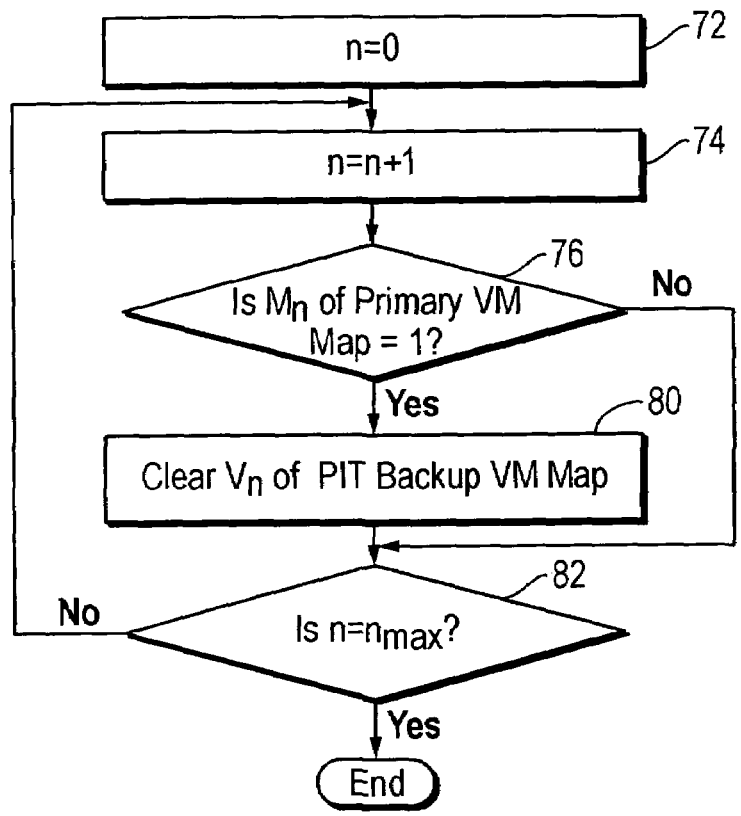
FIG. 7 is a flow chart illustrating operational aspects of the host node shown in FIG. 2 responding to a request to refresh the PIT backup copy of the primary data volume.
FIG. 8 is a block diagram of VM maps in FIG. 6 after the host node of FIG. 2 completes the process shown in FIG. 7.

The PIT backup copy, whether virtual or real, can be refreshed to the state of the primary data volume after data in the primary data volume has been modified. Host node 32 initiates a refresh operation in response to receiving a refresh instruction or in response to internally generating a refresh instruction. FIG. 7 illustrates relevant aspects of a process implemented by host node 32 in response to receiving or internally generating an instruction to refresh the PIT backup copy in data memory 46 to the state of the primary data volume according to one embodiment of the present invention. In step 72, host node 32 sets a variable n in memory to 0. Thereafter, in step 74, host node 32 increments variable n by 1. Host node 32 checks the state of $M_n$ of the primary volume VM map 52. If $M_n$ is set to logical 1, then host node 32 clears $V_n$ of the PIT backup VM map 54 to logical 0, as shown in step 80. Eventually, in step 82, host node 32 compares variable n with $n_{max}$, the maximum number of blocks in data memory 44 that store primary volume data. If n does not equal to $n_{max}$ the process repeats beginning with step 74. When n equals $n_{max}$, the process in FIG. 7 ends. The time it takes host node 32 to complete the process described in FIG. 7 is small compared to the time it takes host node 32 to copy data from a block of data memory 44 to a respective block in data memory 46.

FIG. 8 illustrates the VM maps 52 and 54 shown in FIG. 6 after the process described in FIG. 7. Because one or more of the $V_n$ bits of map 54 are set to logical 0 in FIG. 8, the PIT backup copy in memory 46 is in the virtual state. The virtual PIT backup copy can be transformed into a real copy by a background copying process. In the background copying process, host node 32 checks the state of $V_n$ in map 54. For each $V_n$ set to logical 1, host node 32 copies the data contents of block n in memory 44 to block n in memory 46 and subsequently sets $V_n$ to logical 1. The background copying process ends when all $V_n$ bits in map 54 are set to logical 1. Before this background copying process begins or ends, the primary data volume of data memory 44 can be accessed with read or write-data transactions generated by host node 32 in response to requests received from client computer systems. Modifying data in the primary data volume subsequent to the process of FIG. 7 can be implemented using the process described in FIG. 5.

After its creation, the contents of the PIT backup copy in memory 46 can be modified via a write-data transaction generated by host node 32 to create a modified PIT backup copy. The PIT backup copy (whether virtual or real) in data memory 46 can be accessed via read or write-data transactions before the background copying process begins or ends. When a block n of memory 46 is modified by a write-data transaction, $M_n$ of map 54 is set to logical 1 by host node 32, either before or after data of block n is modified.

A modified PIT backup copy can be refreshed to the state of the primary data volume using the process shown in FIG. 7 with slight modification. More particularly, in step 76, host node checks $M_n$ of the primary volume VM map 52 and the PIT backup VM map 54. If $M_n$ is set to logical 1 in either VM map, then host node 32 clears the $V_n$ and $M_n$ bits of PIT backup VM map 54 in step 80. Clearly, if the Mn bit of PIT backup VM map 54 is set to logical 0, no need exists to clear $M_n$ in VM map 54. If $M_n$ of VM maps 52 and 54 are set to logical 0 in step 76, then the process proceeds to step 82. Once the process of FIG. 7 is complete, write-data transactions to the primary data volume subsequent to the refresh operation can be performed using the process described in FIG. 5.

Returning to FIG. 2, data processing system 30 has a third data storage system 38 with a data memory 48 contained therein. Memory 48 can be used to store a copy of the PIT backup copy or a second PIT backup copy of the primary data volume. For purposes of explanation, it will be presumed that memory 48 stores a virtual copy of the PIT backup copy unless otherwise noted. In one embodiment, the virtual copy of the PIT backup copy can be created in data memory 48 in accordance with the process described in copending U.S. patent application Ser. No. 10/143,059. The virtual copy in memory 48 can be transformed into a real copy of the PIT backup copy by a background copying process executing on host node 32. The virtual copy in memory 48 can be accessed with read and write-data transaction operations unrelated to the background copying process before the virtual copy is transformed into a real copy using the principles described in copending U.S. patent application Ser. No. 10/143,059.

Host node 32 creates the virtual copy of the PIT backup copy by first creating VM map 92 (FIG. 4) in memory. Like VM maps 52 and 54, VM map 92 includes $n_{max}$ entries. Each entry of VM map 92 corresponds to a respective block in memory 48 and includes $V_n$ and $M_n$ bits. The $V_n$ bits of VM map 92 are initially set to logical 0, indicating that respective blocks in data memory 48, and thus all of data memory 48, initially contain no valid data. The $M_n$ bits of VM map 92 are initially set to logical 0, indicating that respective blocks in data memory 48 initially contain no modified data.

Figures 9, 10:
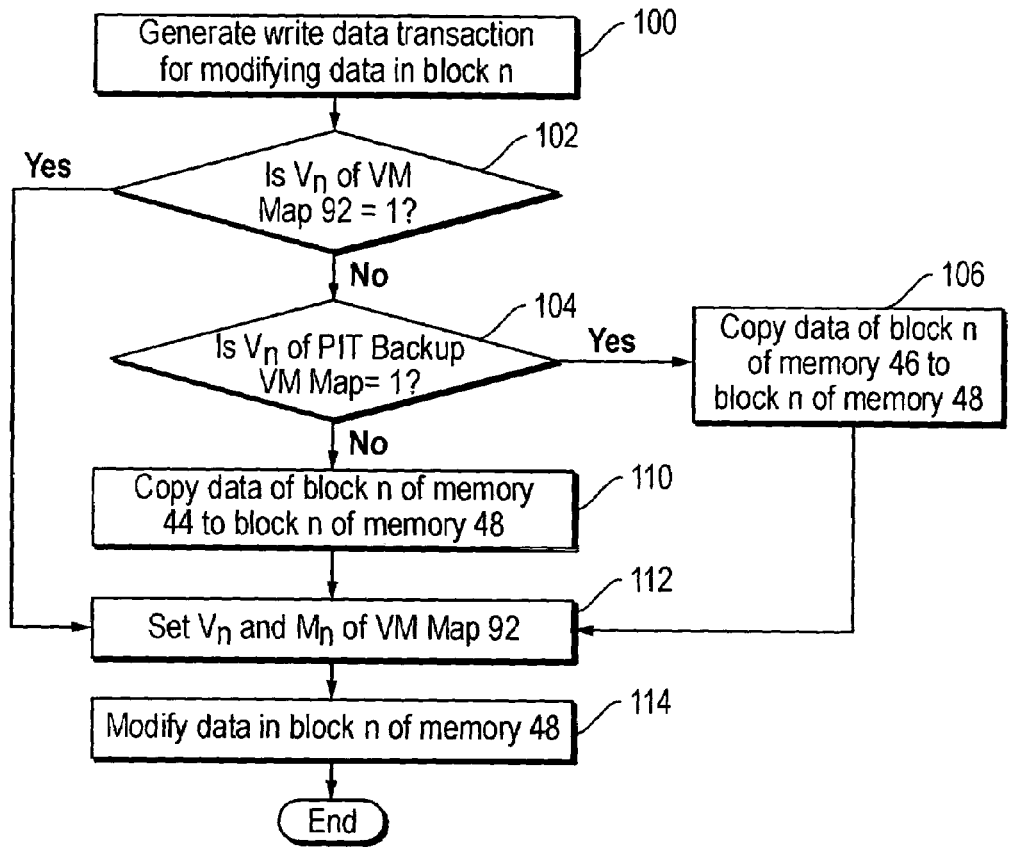
FIG. 9 is a flow chart illustrating operational aspects modifying data of the virtual copy of the PIT backup copy of the primary data volume.
FIG. 10 is a block diagram of VM maps after modification thereof.

Host node 32, as noted, can modify data of the virtual copy in memory 48 via read or write-data transactions. FIG. 9 illustrates operational aspects of host node 32 modifying data of the virtual copy of the PIT backup copy. In step 100, host node 32 generates a write-data transaction for modifying the contents of block n in data memory 48. In step 102, host node reads the $V_n$ bit of VM map 92. If this $V_n$ bit is set to logical 1, then block n of data memory 48 contains the data to be modified by the write-data transaction of step 100. As an aside, the $V_n$ bit of VM map 92 could be set to 1 as a result of a previous write-data transaction that modified data in block n of data memory 48 or as a result of the process of background copying to transform the virtual copy in memory 48 of the PIT backup copy into a real copy. For purposes of explanation, it will be presumed that the $V_n$ bit is set to logical 0 in step 102 so that the process proceeds to step 104.

At step 104, host node 32 reads the $V_n$ bit of the PIT backup VM map 54. If this bit is set to logical 1, then the data contents of block n of data memory 46 is copied to block n of data memory 48. If the $V_n$ bit is set to logical 0, then data of block n of data memory 44 is copied to block n of data memory 48 as shown in step 110. Ultimately, host node 32 sets $V_n$ and $M_n$ of VM map 92 to logical 1, if these bits were not previously set to logical 1. Lastly, data of block n of data memory 48 is modified by the write-data transaction operation of step 100. FIG. 10 illustrates modifications to VM map 92 bits as a result of several write-data transactions to modify data of the virtual PIT copy of the PIT backup copy. FIG. 10 also shows VM maps 54 and 52 drawn with the presumption that the virtual copy of the PIT backup copy was modified before the PIT backup copy was refreshed to the state of the primary data volume. VM maps 54 and 52 are shown in FIG. 10 in the state shown in FIG. 6.

After the copy of the PIT backup copy is created and modified, the copy of the PIT backup copy can be refreshed to either the PIT backup copy or the primary data volume, regardless of whether the copy of the PIT backup copy is in a virtual state or whether the copy of the PIT backup copy has been transformed into a real copy by a background copying process. Moreover, the copy of the PIT backup copy can be refreshed to either the PIT backup copy or the primary data volume regardless of whether the PIT backup copy of the primary data volume is in a virtual state or whether it has been transformed into a real copy by a background copying process.

Figure 11:
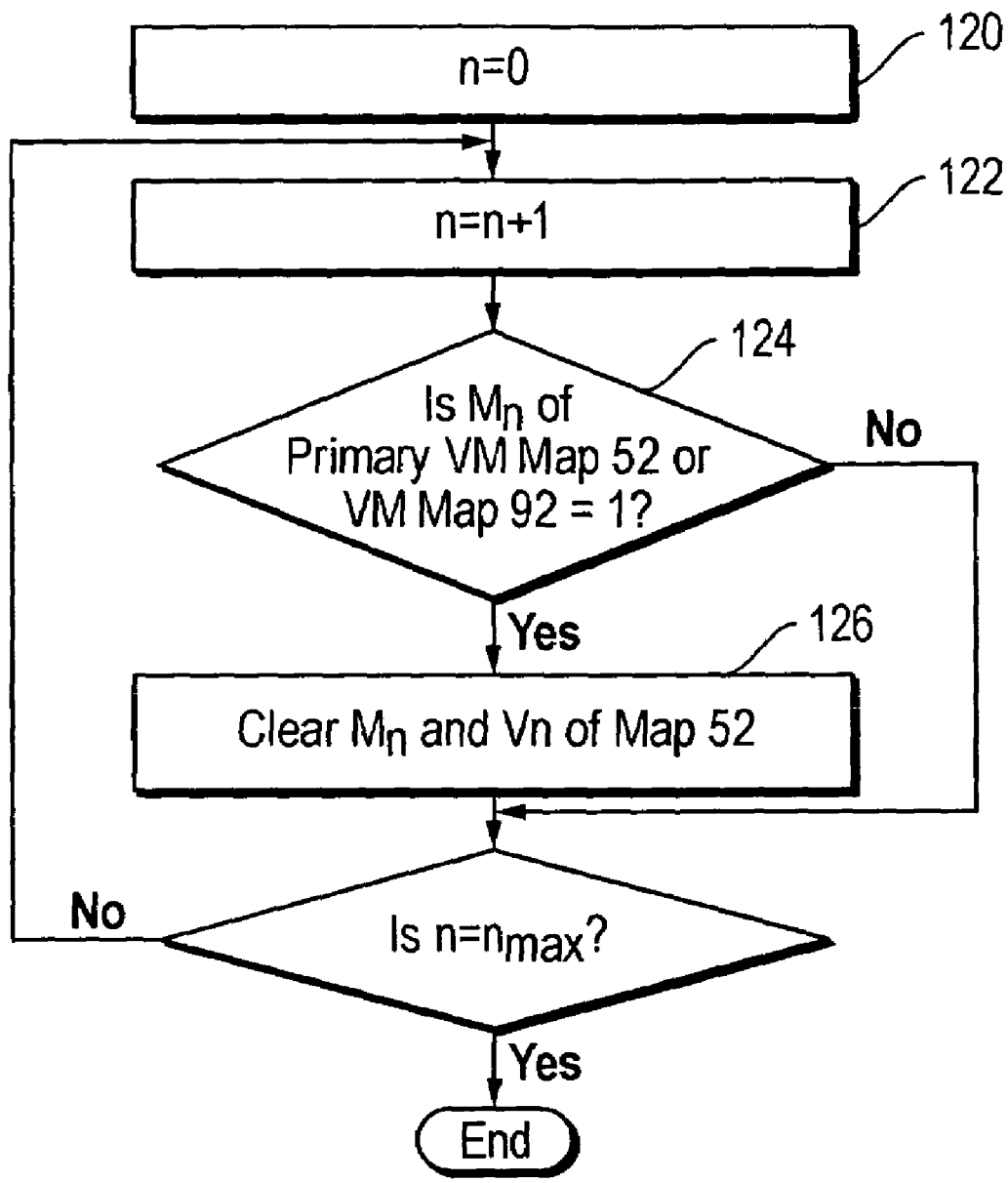
FIG. 11 is a flow chart illustrating operational aspects of the host node of FIG. 2 responding to a request to refresh the virtual copy of the PIT backup copy of the primary data volume.

FIG. 11 illustrates relevant aspects of a process implemented by host node 32 in response to receiving or internally generating an instruction to refresh the copy of the PIT backup copy in data memory 48 to the state of the primary data volume according to one embodiment of the present invention. In step 124, after host node 32 sets variable n in memory to 0 and subsequently increments n by 1, host node 32 reads bit $M_n$ of map 92 and the primary volume VM map 52. If either of these $M_n$ bits are set to logical 1, then in step 126, host node 32 clears $M_n$ and $V_n$ of map 92 to logical 0. It is noted that in an alternative mode, host node 32 may clear only $V_n$ of map 92 if either of the $M_n$ bits are set to logical 1. With $M_n$ and $V_n$ bits of map 92 cleared to logical 0 (or with just Vn bit cleared to logical 0), the data contents of block n of memory 48 should be considered invalid. After step 126 or 124, host node 32 compares the current value of n to $n_{max}$; if n equals $n_{max}$, the process ends. If not, the process repeats itself beginning with step 122 and continues until n equals $n_{max}$.

A background copying process can be employed for copying data from memory blocks in memory 44 (or memory 46 depending on whether the copy of the PIT backup copy is being refreshed to the primary data volume or the PIT backup copy thereof) to respective memory blocks of memory 48 for each memory block of memory 48 that has corresponding $V_n$ and $M_n$ bits of map 92 (or just $V_n$ bit) set to logical 0 after the process in FIG. 11 ends. Before the background copying process begins or ends, write-data transactions to the primary data volume are performed using the process described in FIG. 5 except that in step 64, data of block n in data memory 44 is copied to block n of data memories 46 and 48. Further Before the background copying process begins or ends, write-data transactions to the copy of the PIT backup copy are performed using the process described in FIG. 9, except that steps 104 and 106 are eliminated, and if $V_n$ of VM map 92 equals logical 1 in step 102, the process proceeds directly to step 110 where data of block n of data memory 44 is copied to block n of data memory 48.

The present invention has been described with reference to refreshing a PIT backup copy of a primary data volume and to refreshing a copy of a PIT backup copy. The principles described herein may find application to refreshing a data volume to any other arbitrarily related data volume copy. For example, the principles described herein may find application to refreshing a primary data volume to a real or virtual PIT copy thereof, wherein the primary data volume was modified after creation of the real or virtual PIT copy. Further, host node 32 may create multiple real or virtual PIT backup copies of the primary data volume. A first PIT backup copy of the primary data volume, whether real or virtual, may be refreshed to a second PIT backup copy of the primary data volume using the principles disclosed herein. Further, respective real or virtual copies of the first and second PIT backup copies may be created by the host node, and the copy of the first PIT backup copy of the primary data volume may be refreshed to the copy second PIT backup copy of the primary data volume, or the first PIT backup copy of the primary data volume may be refreshed to the copy of the second PIT backup copy of the primary data volume using the principles described herein.

Although the present invention has been described in connection with several embodiments, the invention is not intended to be limited to the embodiments described herein. On the contrary, it is intended to cover such alternatives, modifications, and equivalents as can be reasonably included within the scope of the invention as defined by the appended claims.

We claim:

1. A method comprising:
    creating a first point-in-time (PIT) virtual copy of a data volume;
    modifying first data within the data volume after creation of the first PIT virtual copy;
    refreshing the first PIT virtual copy to create a second PIT virtual copy of the data volume, wherein the first PIT virtual copy is refreshed after modification of the first data within the data volume.

2. The method of claim 1 further comprising:
    generating a refresh instruction, wherein the first PIT virtual copy is refreshed in response to generation of the refresh instruction, wherein the refresh instruction is generated after modifying the first data;
    in response to generation of the refresh instruction, copying the modified first data from a first memory to a second memory that stores data of the first virtual copy;
    modifying second data of the data volume, wherein the second data is modified after generation of the refresh instruction, and wherein the second data is modified before the modified first data is copied to the second memory.

3. The method of claim 2 further comprising transforming the second PIT virtual copy into a real PIT copy, wherein the second data is modified before the second PIT virtual copy is transformed into the real PIT copy.

4. The method of claim 1 further comprising:
    creating a PIT copy of the first PIT virtual copy;
    generating a second refresh instruction;
    refreshing the PIT copy to create a third virtual PIT copy of the data volume in response to generating the second refresh instruction.

5. The method of claim 1 further comprising:
    creating a PIT copy of the first PIT virtual copy;
    generating a second refresh instruction;
    refreshing the PIT copy to create another PTI copy of the first PIT virtual copy in response to generating the second refresh instruction.

6. The method of claim 4 further comprising:
    modifying third data of the data volume after creating the first PIT virtual copy, wherein the second refresh instruction is generated after modifying the third data;
    in response to generation of the second refresh instruction, copying the modified third data to a third memory;
    modifying fourth data of the data volume, wherein the fourth data is modified after generation of the second refresh instruction, and wherein the fourth data is modified before the modified third data is copied to the third memory.

7. A method comprising:
    storing data in a plurality of first memory blocks;
    copying data from several of the first memory blocks to several of a plurality of second memory blocks, respectively;
    switching the state of several second bits in memory in response to copying data from the several first memory blocks to the several second memory blocks, respectively, wherein each of the second bits corresponds to a respective second memory block;
    modifying data stored in one of the several first memory blocks after copying data from the several first memory blocks to the several second memory blocks, respectively;
    switching the state of a first bit in memory in response to modifying data stored in the one of the several first memory blocks, wherein the first bit corresponds to the one of the several first memory blocks;
    generating a refresh instruction, wherein the refresh instruction is generated after modifying data stored in the one of the several first memory blocks;
    switching the state of the one of the several second bits in response to the generation of the refresh instruction.

8. The method of claim 7 further comprising switching the state of the one of the several first bits back to its original state in response to the generation of the instruction to refresh.

9. A computer readable medium comprising instructions executable by a computer system to implement a method, the method comprising:
    copying first and second data portions of a data volume to first and second memory blocks, respectively, of a memory coupled to the computer system;
    setting first and second bits stored of a first map in memory, wherein the first and second bits correspond to the first and second memory blocks, respectively;
    modifying data of the first data portion of the data volume after the first data portion is copied to the first memory block;
    setting a first bit in a second map stored in memory after data of the first data portion is modified;
    generating an instruction to refresh;
    clearing the first bit of the first map in response to generation of the refresh instruction.

10. The computer readable medium of claim 9 wherein the method further comprises:
    overwriting the first data portion in the first memory block with the modified data;
    modifying the second data portion of the data volume after the first data portion is copied to the first memory block, after generation of the refresh instruction, and before the first memory block is overwritten with the first modified data.

11. A computer readable medium comprising instructions executable by a computer system to implement a method, the method comprising:
    creating a first point-in-time (PIT) virtual copy of a data volume;
    refreshing the first PIT virtual copy to create a second PIT virtual copy of the data volume, wherein the first PIT virtual copy is refreshed after modification of first data within the data volume.

12. The computer readable medium of claim 11 wherein the method further comprises:

generating a refresh instruction, wherein the first PIT virtual copy is refreshed in response to generation of the refresh instruction, wherein the refresh instruction is generated after modifying the first data;

in response to generation of the refresh instruction, copying the modified first data from a first memory to a second memory that stores data of the first virtual copy;

modifying second data of the data volume, wherein the second data is modified after generation of the refresh instruction, and wherein the second data is modified before the modified first data is copied to the second memory.

13. The computer readable medium of claim 12 wherein the method further comprises transforming the second PIT virtual copy into a real PIT copy, wherein the second data is modified before the second PIT virtual copy is transformed into the real PIT copy.

14. The computer readable medium of claim 11 wherein the method further comprises:

creating a PIT copy of the first PIT virtual copy;

generating a second refresh instruction;

refreshing the PIT copy to create a third virtual PIT copy of the data volume in response to generating the second refresh instruction.

15. The computer readable medium of claim 14 wherein the method further comprises:

modifying third data of the data volume after creating the first PIT virtual copy, wherein the second refresh instruction is generated after modifying the third data;

in response to generation of the second refresh instruction, copying the modified third data to a third memory;

modifying fourth data of the data volume, wherein the fourth data is modified after generation of the second refresh instruction, and wherein the fourth data is modified before the modified third data is copied to the third memory.

16. The computer readable medium of claim 11 wherein the method further comprises:

creating a PIT copy of the first PIT virtual copy;

generating a second refresh instruction;

refreshing the PIT copy to create another PTI copy of the first PIT virtual copy in response to generating the second refresh instruction.

* * * * *